United States Patent [19]
Toyoda

[11] 3,963,851
[45] June 15, 1976

[54] PAPER FOR ADHESIVE STICKERS AND THE LIKE

[75] Inventor: Takashi Toyoda, Ibaraki, Japan

[73] Assignee: Kabushiki Kaisha Oji Yuka Goseishi Kenkyujo, Tokyo, Japan

[22] Filed: Oct. 9, 1974

[21] Appl. No.: 513,473

Related U.S. Application Data

[63] Continuation of Ser. No. 273,964, July 21, 1972, abandoned.

[30] Foreign Application Priority Data

Aug. 6, 1971  Japan.............................. 46-59485

[52] U.S. Cl............................ 428/305; 428/306; 428/308; 428/309; 428/323; 428/325; 428/327; 428/328; 428/331; 428/910
[51] Int. Cl.².................... B32B 3/26; B32B 5/18
[58] Field of Search ......... 161/160, 162, 168, 402, 161/117; 428/40, 41, 323-331, 910, 305, 306, 308, 309

[56] References Cited
UNITED STATES PATENTS

| | | |
|---|---|---|
| 3,738,904 | 6/1973 | Ikeda et al. ..................... 161/402 |
| 3,765,999 | 10/1973 | Toyoda .............................. 428/394 |
| 3,783,088 | 1/1974 | Yoshiyasu et al. .................. 428/330 |
| 3,790,435 | 2/1974 | Tanaba et al. ...................... 161/160 |

*Primary Examiner*—William J. Van Balen
*Attorney, Agent, or Firm*—Wenderoth, Lind & Ponack

[57] ABSTRACT

A paper-like layer of a synthetic-resin film having a relatively high concentration of microvoids, for high opacity, is laminated with a substrate layer of a synthetic-resin film having a relatively low concentration of microvoids, for high strength, and having a surface for coating thereof with a tacky adhesive thereby to produce a laminated adhesive paper, which is temporarily adhered to a backing paper and can be peeled in an intact state without tearing away from the backing paper for use. The microvoids in each layer are formed by blending a filler with resin of that layer and stretching the resin film in the direction of at least one of two othogonal axes.

5 Claims, 2 Drawing Figures

PAPER FOR ADHESIVE STICKERS AND THE LIKE

This application is a continuation of Ser. No. 273,964 filed July 21, 1972, now abandoned.

BACKGROUND OF THE INVENTION

This invention relates generally to materials for stickers, labels, adhesive tapes, and the like and more particularly to a new and advanced stock paper of laminated structure and highly desirable characteristics for use in stickers, labels, and the like.

Among labels, stickers, adhesive tapes, sticker tapes, and the like, there are those of the type wherein the front or display surface of a stock paper sheet is printed with desired inscriptions or marks, while the reverse surface is coated with an adhesive material and temporarily adhered to a backing paper sheet, and the stock paper is pulled apart from the backing paper at the time of use and adhered to the objective surface.

The "stock paper" and "backing paper" in this case are not restricted to ordinary cellulosic papers but, in certain cases, may be synthetic resin films, cellophane, metal foils, and other film and sheet materials. As a substitute for cellulosic papers, so-called synthetic papers produced by rendering synthetic resin films into papery form are known, and such synthetic papers can also be used as adhesive stock paper as described above and, of course, can be used also as backing papers.

For the adhesive, any of the various kinds of adhesives, particularly pressure-sensitive adhesives can be used. Example of suitable adhesives are elastomeric materials such as natural or synthetic rubbers, acrylic polymers, and rosin derivatives in solution or in an aqueous emulsion optionally containing some additives such as fillers, plasticizers and other modifiers. The solution or emulsion can be applied directly onto the adhesive stock paper or first onto the backing film and then transferred to the adhesive stock paper.

One group of synthetic papers, known as filler-void-whitened synthetic papers, is produced in each instance by stretching a film of a synthetic paper in which a fine filler has been blended to cause the formation of minute voids or microvoids and thereby to produce a material of a papery nature. The microvoids in the vicinity of the surface are communicative with the outside. While the synthetic resin film in this case may be of a single-ply or of a multiple-ply structure, it is desirable that the filler content of the papery surface be high, and that the elongation due to stretching be large, whereby the void content will be high in order to obtain good papery characteristics, particularly good printability.

While a synthetic paper of this filler-void-whitened type can also be used, of course, as an adhesive stock paper, inconvenience may be encountered in some cases depending on the kind of adhesive and/or adhesiveness of the backing paper surface, which may be considered to be non-adhesive. More specifically, a large number of microvoids are formed on the surfaces of the filler-void-whitened synthetic paper in order to improve the paperiness thereof. However, this results in a relatively low surface strength, and, consequently, the stock paper in some cases is ripped when being peeled apart from the backing paper and cannot be separated completely as a whole piece from the backing paper.

SUMMARY OF THE INVENTION

It is an object of this invention to provide a solution to the above described problem. I have found that this object can be achieved by causing the filler contents in the papery surface and the adhesive surface of the stretched synthetic resin film to be different.

According to this invention, briefly summarized, there is provided a stock paper for adhesive use in the form of a laminated structure comprising a papery layer of a synthetic-resin film having microvoids of a "void" (as defined thereinafter) of from 20 to 60 percent and a substrate layer of a synthetic-resin film having microvoids of a void of from 2 to 40 percent and a surface for adhering to a backing paper, the microvoids being formed by blending fillers with the synthetic resins of the films and stretching each film with an elongation of at least 3.5 times in the direction of at least one of two orthogonal axes. The resulting synthetic paper is coated over the exposed surface of its substrate layer with a tacky adhesive thereby to produce an adhesive, paper, which is temporarily adhered to a backing paper and can be peeled in an intact state without tearing away from the backing paper for use.

The nature, utility, and further features of this invention will be apparent from the following detailed description beginning with a consideration of the general aspects of the invention and concluding with specific examples of practice illustrating preferred embodiments thereof.

DETAILED DESCRIPTION

Figure 1:
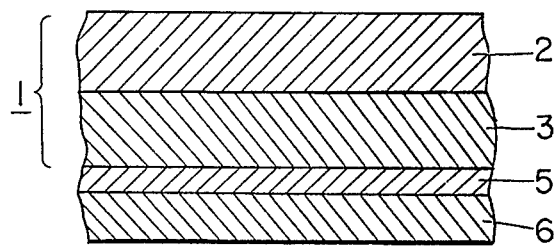
FIGS. 1 and 2 are enlarged, fragmentary, sectional views of two specific examples of adhesive stock papers according to this invention which are adhered to sheets of backing paper.

The term void (also called "fractional void" or "voidage" in certain references) as used herein is defined as follows in percent.

$$\text{void} = \frac{\left(\begin{smallmatrix}S.G.\\ \text{before}\\ \text{stretching}\end{smallmatrix}\right) - \left(\begin{smallmatrix}S.G.\\ \text{after}\\ \text{stretching}\end{smallmatrix}\right)}{(S.G. \text{ before stretching})} \times 100,$$

where S.G. designates specific gravity.

While the void and the filler content do not have correspondence in principle, they have a proportional relationship when the stretching conditions and conditions such as the film material are constant.

Thus, the adhesive stock paper according to this invention is constituted by a combination of various essential features whereby it satisfies certain requirements relating to product quality of adhesive stock papers of the instant class as, for example, the following requirements.

1. Good printability, i.e., capable of being printed by relief or anastatic printing, intaglio printing, or lithographing.
2. Good adhesiveness of the adhesive with respect to the surface of substrate film of the stock paper.
3. High surface strength, particularly the strength of the substrate surface to be coated with the adhesive.
4. High opacity.

5. Low degree of curling due to heat contraction at the time of fabrication.

The adhesive stock paper according to this invention and fulfilling the above recited requirements is a synthetic paper produced, basically, by first blending a fine filler with a synthetic resin and then stretching the filler-containing resin in the direction of at least one coordinate axis, thereby to create a large number of microvoids. Furthermore, from the nature of this invention, this synthetic paper is of laminar structure.

A filler-void-whitened, synthetic paper of this laminer structure can be produced by any suitable process. One process, for example, comprises preparing filler-containing and stretched synthetic resin films to constitute the paper-like layer and the substrate layer (and a film constitute an intermediate layer if necessary) and securing these films together by means such as an adhesive or heat sealing.

Another process comprises preparing a first synthetic resin film which has or has not been stretched, extruding a second synthetic resin film onto at least one surface of the first resin film to form a laminer structure, and stretching the laminer structure thus obtained in a longitudinal direction or/and transverse direction.

While almost any stretchable synthetic resin can be used for this fabrication process, a crystalline polymer is preferably for producing an effect of improving strength and other properties of the product due to molecular orientation caused by the stretching.

Specific examples of synthetic resins of this character are: polyolefin resins such as polymers of ethylene, propylene, and butene-1, as homopolymers, mutual copolymers thereof, and copolymers thereof with other monomers copolymerizable therewith such as vinylacetate, acrylate esters, and the like; polystyrene resins such as polymers of styrene and side-chain and/or nuclear-substituted styrenes such as $\alpha$-methyl styrene, vinyl toluenes, and o-, m-, and p-chlorostyrenes, as homopolymers, mutual copolymers thereof, and copolymers thereof with other monomers copolymerized therewith such as acrylonitrile and methacrylate esters; and homopolymers and copolymers of vinyl halides such as vinyl chloride, acrylate esters such as loweralkyl ($C_1 - C_6$) acrylates and methacrylate esters such as lower alkyl ($C_1 - C_6$) methacrylates, and vinyl ester such as vinyl formate, vinyl acetate and vinyl propionate. The most preferably resins are: polyolefin resins such as polymers of ethylene, propylene, and butene-1, as homopolymers, mutual copolymers thereof such as resinous ethylene-propylene copolymers, and copolymers thereof with other monomers such as resinous ethylene-lower-alkyl ($C_1 - C_6$) acrylate copolymers, and resinous ethylene-vinyl ester copolymers such as ethylene-vinylacetate, and ethylene-vinyl propionate copolymers; and mixtures of such polyolefin resins with styrene resins such as polystyrene, and poly-$\alpha$-methylstyrene.

The synthetic resins constituting the laminated layers may be different in each layer, and, moreover, the synthetic resins may be mixtures.

For the fine filler, any of the fillers used in synthetic-resin papers, cellulosic papers, and the like can be used.

Specific examples of the most representative of these fillers are clays, alumina, silica, diatomaceous earth, calcium carbonate, barium sulfate, zinc oxide, titanium oxide, and synthetic resin powders. It is desirable that these fillers be used in an amply fine form.

Films are formed by any suitable known process from resins in which these fillers have been blended.

One representative example of a filler-void-whitened synthetic paper of laminated structure is a synthetic paper of a structure made up of a biaxially-stretched resin film A and a monoaxially stretched resin film B bonded to one surface or to each of the two surfaces of the film A. The film A is formed from a resin selected from polyethylenes, polypropylenes, resinous poly(ethylenepropylene)s, other polyolefins, mixtures of these polyolefins, and mixtures of these resins with other resins such as polystyrenes and contains a filler of a content of the order of from 0 to 20 percent by weight. The film B is formed from the same resin as the film A or a different resin selected from the above enumerated group of resins and has a filler content of from 0.5 to 65 percent by weight.

In the practice of this invention, a stock paper of a structure wherein the film B is bonded to only one surface of the film A is suitable since the biaxially stretched film A can be utilized as the substrate layer of a synthetic-resin having a surface to be adhered to a backing paper. A laminated structure of this character can be fabricated by first melt extruding and laminating the film B, which at this stage is still unstretched, on one surface of the film which has been stretched in only one direction and then stretching the structure thus laminated in the direction perpendicular to the first direction.

In accordance with this invention, the void of the papery layer must be within the range of from 20 to 60 percent, which corresponds to a filler concentration of from 8 to 20 percent by volume. These limits have been established on the basis of the following findings.

When this void is less than 20 percent, the papery layer becomes less suitable for lithographing and relief printing, particularly in respect to ink transfer, ink drying, and ink adhesion characteristics, whereby the paper is not suitable as a print paper for general use. On the other hand, when this void is higher than 60 percent, the surface smoothness becomes poor and thereby gives rise to poor printability, and, moreover, the adhesive strength with respect to the substrate layer and the strength of the papery layer itself become low.

I have found further that the void of the substrate layer to be coated with the adhesive should be in the range of from 2 to 40 percent, which corresponds to a filler content of from 0.5 to 8 percent by volume, for the following reason. When this void is less than 2 percent, the adhesiveness with respect to the adhesive is poor, whereas when this void is greater than 40 percent, improvement of the surface strength of the substrate layer, which is an object of this invention, cannot be expected. I have found that a preferable range is from 2 to 30 percent.

In order to display printed inscriptions in an effective manner on stickers, labels, and the like, it is generally preferably, except for instances of special uses, that the surface of the object on which they are to adhere be prevented from being visible through the paper. Accordingly, the paper, i.e., the adhesive paper should be amply opaque. The opacity of a synthetic paper of laminar structure is the sum of the opacities of the papery layer and the substrate layer, while the opacity of each layer is determined by the void, i.e., the quantity of filler, contained therein and the thickness of that layer.

Still another essential feature of the adhesive stock paper according to this invention is that each of the papery and substrate layers is a film which has been stretched at least 3.5 times in at least one axial direction. This stretching may be carried out separately with respect to each layer, or it may be carried out on the laminate after lamination. While the upper limit of the stretch elongation is determined by the limit of stretchability, it is generally within 10 times in one axial direction.

Since a synthetic paper of this character is essentially a plastic film, it can be subjected by various techniques to physical and chemical surface treatments applicable to plastic films such as, for example, corona discharge treatment, flame treatment, and chromic acid mixture liquid treatment. Such a surface treatment is desirable in some cases, particularly since the surface of the substrate layer to be coated with the adhesive is less adhesive as the result of the low filler content of the substrate layer.

The surface of the substrate layer of an adhesive stock paper of this character can be coated with the adhesive by any suitable method. For example, according to one method, the adhesive stock paper is first produced, and then the adhesive is applied as a coating on the surface of the substrate layer of the paper. Another method, which enhances the desirable features of this invention, comprises combining an adhesive coating process step in the process of producing the synthetic paper. More specifically, the substrate layer (independently or after lamination with another layer such as a papery layer) in unstretched state is first coated with the adhesive and is then stretched.

Enlarged, fragmentary cross sections of examples of adhesive stock papers according to this invention, temporarily adhered to backing paper, are shown in the accompanying drawing, these sections being taken in planes perpendicular to the plane of the paper.

Figure 2:
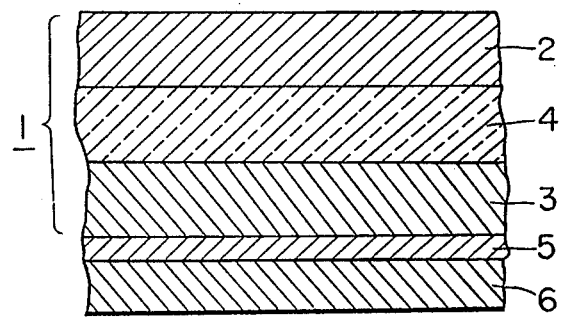

An example structure of an adhesive stock paper 1 comprising a papery layer 2 and a substrate layer 3 is illustrated in FIG. 1, while an example structure comprising a papery layer 2, a substrate layer 3, and one or more intermediate layers (one layer in the example shown) 4 interposed between the papery and substrate layers 2 and 3 is illustrated in FIG. 2. In each case, a tacky adhesive layer 5 is adhered to the adhesive stock paper 1, more specifically, to the outer surface of the substrate layer 3, and a backing paper 6 is disposed to cover the outer surface of this adhesive layer 5. The adhesive can be any of the ones hereinbefore described. Preferably, the adhesive is an acrylic in solution and the solution is applied first to the backing paper and then transferred to the adhesive stock paper. The backing paper can be replaced by any sheet material as hereinbefore described.

In order to indicate still more fully the nature and utility of this invention, the following specific examples of practice constituting preferred embodiments thereof and results are set forth, it being understood that these examples are presented as illustrative only, and that they are not intended to limit the scope of the invention.

Example 1.

Polypropylene of a melt index (MI) of 1.5 was admixed with 4 percent by volume of a clay of an average particle diameter of 3 microns, and the resulting mixture was formed into a sheet by means of an extruder operated at 250°C. This sheet was stretched with an elongation of 4 times in a direction designated as the longitudinal direction.

Separately, a second sheet was similarly extruded from a mixture of polypropylene of an MI of 10 and 20 percent by volume of a clay of an average particle diameter of 2 microns and simultaneously laminated with the first sheet to form a laminated sheet structure, which was stretched with an elongation of 5 times in the transverse direction, i.e., perpendicular to the longitudinal direction. The edge parts were trimmed off, and the sheet was wound as a roll.

The synthetic paper thus produced was found to be highly suitable as an adhesive stock paper for stickers.

Example 2.

The procedure set forth in Example 1 was followed to produce the following samples.

| Sample | Papery Layer Void | Papery Layer Filler content | Substrate layer Void | Substrate layer Filler content |
|---|---|---|---|---|
| A | 26 | 8 | 2.2 | 0.5 |
| B | 37 | 10 | 2.4 | 0.5 |
| C | 39 | 10 | 8.0 | 3 |
| D | 52 | 20 | 0 | 0 |
| E | 58 | 20 | 42.0 | 10 |
| F | 65 | 30 | 38.0 | 8 |
| G | 81 | 35 | 29.5 | 6 |

These samples were subjected to tests for adhesive strength, state of peeling, opacity, and degree of visibility of back, whereupon the following results were obtained.

| Sample | Adhesive strength (kg/2cm) | Opacity (Hunter) (%) | Back visibility (Hunter) (%) | State* of Peeling |
|---|---|---|---|---|
| A | 520 | 74 | 58 | o |
| B | 540 | 82 | 75 | o |
| C | 865 | 88 | 85 | o |
| D | 230 | 91 | 86 | o |
| E | 310 | 94 | 89 | X |
| F | 440 | 97 | 92 | Δ |
| G | 810 | 98 | 93 | o |

REMARKS
Sample
 A : Back visible when stuck on.
 D : Does not adhere.
 E : Tears when peeled; torn part remains on backing paper
 G : Low surface smoothness, 250 sec.; poor printing finish.
 B, C, F : Good

*o : Good
Δ: Fair
X : Poor

I claim:

1. A stock paper for adhesive use comprising, in combination as a laminated structure, a papery layer of a synthetic-resin film having a filler content of 8 – 20% by volume of the papery layer and having a void content of from 20 to 60 percent, a substrate layer of a synthetic-resin film having a filler content of 0.5 – 8% by volume of the substrate layer and having a void content of from 2 to 30 percent and having a surface to adhere to a backing paper and at least one intermediate layer of a synthetic-resin film interposed between the paper layer and the substrate layer, each of said papery and substrate layers being monoaxially stretched to an elongation of at least 3.5 times and said intermediate layer being biaxially stretched, said filler content and void content of the papery layer being higher than the filler content and void content of the substrate layer.

2. A stock paper for adhesive use according to claim 1 in which the synthetic resin of the papery layer is a resinous polymer of a monomer selected from the group consisting of ethylene, propylene, butene-1, and mixtures thereof.

3. A stock paper for adhesive use according to claim 2 in which said resinous polymer is selected from the group of isotactic polypropylene, and resinous copolymers of ethylene and propylene.

4. A stock paper for adhesive use according to claim 1 in which the synthetic resin of the substrate layer is a resinous polymer of a monomer selected from the group consisting of ethylene, propylene, butene-1, and mixtures thereof.

5. A stock paper for adhesive use according to claim 4 in which said resinous polymer is selected from the group consisting of isotactic polypropylene, and resinous copolymers of ethylene and propylene.

* * * * *